(12) United States Patent
Tian et al.

(10) Patent No.: US 9,372,082 B1
(45) Date of Patent: Jun. 21, 2016

(54) METHOD FOR ALONG-THE-CABLE UNDERWATER PROFILE MEASUREMENT

(71) Applicant: OCEAN UNIVERSITY OF CHINA, Qingdao, Shandong (CN)

(72) Inventors: Jiwei Tian, Shandong (CN); Wei Zhao, Shandong (CN); Ming Xu, Shandong (CN); Qingxuan Yang, Shandong (CN)

(73) Assignee: Ocean University of China, Qingdao, Shandong (CN)

( * ) Notice: Subject to any disclaimer, the term of this patent is extended or adjusted under 35 U.S.C. 154(b) by 0 days.

(21) Appl. No.: 14/851,506

(22) Filed: Sep. 11, 2015

(30) Foreign Application Priority Data

Dec. 25, 2014 (CN) .......................... 2014 1 0821320

(51) Int. Cl.
  *G01F 23/56* (2006.01)
  *G01C 13/00* (2006.01)

(52) U.S. Cl.
  CPC .............. *G01C 13/008* (2013.01); *G01C 13/00* (2013.01)

(58) Field of Classification Search
  CPC ............................... G01C 13/00; G01C 13/008
  USPC ............................................................ 73/319
  See application file for complete search history.

(56) References Cited

U.S. PATENT DOCUMENTS

| | | | |
|---|---|---|---|
| 5,665,909 A * | 9/1997 | Doherty | G01N 1/12 73/170.29 |
| 6,536,277 B1 | 3/2003 | Chuang | |
| 8,875,645 B1 | 11/2014 | Webb et al. | |
| 2001/0015454 A1 | 8/2001 | Lee et al. | |
| 2006/0225810 A1* | 10/2006 | Baylot | B63B 27/08 141/98 |

FOREIGN PATENT DOCUMENTS

| | | | | |
|---|---|---|---|---|
| CN | 201037770 Y | | 3/2008 | |
| CN | 201852611 U | * | 6/2011 | |
| CN | 103591941 A | * | 2/2014 | .............. B63B 22/04 |
| CN | 104149951 A | * | 11/2014 | |

OTHER PUBLICATIONS

Office Action of Chinese Application No. 201410821320.3 dated Aug. 6, 2015, with English language translation, 6 pages.*

* cited by examiner

*Primary Examiner* — Lisa Caputo
*Assistant Examiner* — Roger Hernandez-Prewit
(74) *Attorney, Agent, or Firm* — Buchanan Ingersoll & Rooney PC (57) ABSTRACT

A method includes: a guide cable and an observation platform is provided, a profiler is mounted, and a trigger gear is set at the bottom of the guide cable; a weight drop-off gear is set at the top of the guide cable, when the observation platform is located at the top of the guide cable, one weight is released by the weight drop-off gear onto the observation platform so that the observation platform descends along the guide cable owing to additional gravity, and when the observation platform descends to the given position of the trigger gear at the bottom of the guide cable, the release gear releases the weight on the observation platform so that the observation platform returns by its own buoyancy to the top along the guide cable; another weight is subsequently released by the weight drop-off gear so that the observation platform repeats the foregoing reciprocating motion.

6 Claims, 14 Drawing Sheets

METHOD FOR ALONG-THE-CABLE UNDERWATER PROFILE MEASUREMENT

TECHNICAL FIELD

The present invention relates to the field of the water environment monitoring technologies and more specifically to a new method for along-the-cable underwater profile measurement.

BACKGROUND

Presently, there are two basic methods for along-the-cable underwater profile measurement:

A first method is that the mobile observation platform ascends or descends under the water through controlling the buoyancy and gravity of the observation platform. The method has been applied in most of the basic schemes for the current formed equipment, for instance, a mobile sealed compartment is connected with an outer oil sac which is connected with an inner oil sac via a solenoid valve and an oil pump is pressurized by an electronic circuit controlled air pump in the compartment to discharge the oil from the inner oil sac to the outer oil sac so as to increase the volume of the drain water from the platform, thus increasing the buoyancy of the platform to make the platform ascend. On the contrary, when the oil returns from the outer oil sac to the inner oil sac owing to water pressure, the platform will descend owing to the decrease of the buoyancy of the platform. Although the method can easily control, through its circuit, the slight buoyancy of the platform and change the buoyancy without additional electric power consumption during platform motion, it has the following challenges:

1. The mechanical control part in the compartment is complex and requires a precision air pump, oil pump, solenoid valve and accurate measurements with related sensors;
2. All power is sourced from batteries which have a huge influence on the gravity of the sealed compartment, the design of compartment body is closely related to the quantity of batteries, their service life directly determines the overall design, that is, the battery may affect the whole method;
3. The method, with limited working water depth, is mostly applied to the measurements for the water depth less than or within 2000 m at present, and for the water depth more than 2000 m, the power consumption of the batteries required for pumping the oil to the outer oil sac because the increase of water depth cannot keep balance with the battery efficiency, the overall design of the compartment cannot satisfy further power consumption, thus resulting in failure to complete further measurements.

A second method is that a motor is adopted to drive the gear to climb along the cable. The method works as follows: The moving platform is seized onto the underwater cable via a roller, the platform buoyancy is set zero, the motion of the platform along the cable is driven by the motor in the electronic compartment, the motor drives the gear to rotate, thus driving the roller outside the compartment to move up and down along the cable and the ascending and descending of the platform are controlled through controlling the rotation direction of the motor. The method has the advantages including simple mechanical design part, minor influence of the water depth and simplicity in electronic control but has several difficulties:

1. Every step of platform motion will consume electricity, which constitute a huge challenge to the batteries, and like the first method, there are corresponding requirements on the design of the electronic compartment, the times of the working profiling determines the quantity of the batteries, thus determining the design size of the electronics compartment.
2. The platform, with limited motion speed, requires the motor for every meter of motion in the process of ascending and descending, and huge electricity consumption is required with the increase of the platform motion speed, which constitute a huge challenge to the reliability of the inner motor and outer roller.

It can be seen that the power energy storage mechanism (battery and motor) and measurement mechanism are provided on one platform for the above-mentioned two measurement methods so that there is a problem that the energy for controlling the platform motion is restricted by the battery, thus exerting a decisive influence on the overall design.

SUMMARY OF THE DISCLOSURE

Based on the technical problem, the present disclosure provides a new method for along-the-cable underwater profile measurement, wherein the power energy storage mechanism (weight) is separated from the measurement platform, the energy storage mechanism provides power through potential mechanical energy (weight) in lieu of the batteries and the measurement platform can control the ascending and descending of the platform just with the power energy (one weight) required for one profile measurement being carried, thus fundamentally solving the most difficult power problem of the moving platform.

The technical solution adopted by the present disclosure is:
A method for along-the-cable underwater profile measurement, which comprises:

(1) A guide cable is anchored at the predefined measured water area and an observation platform that can make reciprocating motion along the guide cable is provided, a profiler is mounted on the observation platform, then the buoyancy of the observation platform is adjusted greater than zero and a trigger gear is set at the bottom of the guide cable;

(2) A weight drop-off gear is set at the top of the guide cable, when the observation platform is located at the top of the guide cable, one weight is released by the weight drop-off gear onto the observation platform to enable the buoyancy of the observation platform to drop smaller than zero so that the observation platform descends constantly along the guide cable, and when the observation platform descends to the given position of the trigger gear at the bottom of the guide cable, the release gear on the observation platform is triggered by the trigger gear to release the weight on the observation platform so that the observation platform returns by its own buoyancy to the top along the guide cable; the profiler on the observation platform observes the profile of the water area while the observation platform is making reciprocating motion along the guide cable;

(3) When the observation platform returns to the top of the guide cable or when the observation platform returns to the top of the guide cable and stays there for a period, another weight is released by the weight drop-off gear onto the observation platform so that the observation platform repeats the reciprocating motion, and the profiler subsequently observes the profile of the water area.

Preferably, the weights are high-density balls or blocks.

Preferably, in the steps, several weights with different weight are provided for the purpose of adjusting the descending speed of the observation platform through changing the weight of the weights carried by the observation platform.

Preferably, in the steps, the measurement times of the water area profile is adjusted by setting the quantity of the weights to be released, the descending speed of the platform is changed through setting the weight of the weights and the measurement cycle of the water area profile is adjusted through setting the drop-off interval between adjacent weights.

Preferably, the guide cable longitudinally passes through the observation platform via the cable hole on the observation platform.

Preferably, the trigger gear is a restraining mass, the release gear is a mechanical release gear, and when the observation platform descends to the bottom of the guide cable, the mechanical release gear on the observation platform will be subject to the shock from the restraining mass, triggering actions accordingly so that the observation platform throws out the weight carried by it.

Compared with the prior art, the technical advantageous effects of the present disclosure are that:
(1) The present disclosure debottlenecks the selection of batteries as power source of the along-the-cable observation platform at present, takes control over the descending and ascending of the observation platform through throwing out the weight carried by the platform after it descends to a certain depth, thus solving a series of problems that are caused when the batteries are selected as power source.
(2) The descending speed of the observation platform in the present disclosure is controlled by changing the weight of the weights and can be adjusted in a large speed range, which generally ranges from 0.1 to 0.8 m/s; the observation platform can descend to any depth in sea, the measurement range is not affected by the water depth and it is possible to measure the profile data from the water surface to the bottom; any related instrument may be carried; it permits long-time continuous observation and the observation times of the water area profile may be determined by adjusting the quantity of the carried weights, independent of the observation platform.
(3) In the present disclosure, the mobile observation platform and the power drive are designed as split type and the overall structure design is simpler;
(4) As a whole, the present disclosure nearly has no disadvantages compared with other existing methods and instruments for along-the-cable underwater observation.

BRIEF DESCRIPTION OF DRAWINGS

The present invention is described further in conjunction with the drawings and specific preferred embodiments.

As shown in these figures, 1—weight drop-off gear, 101—shell, 102—support, 103—electronic control unit, 1031—jack, 1032—electronic compartment, 1033—lifting platform, 1034—the first drive rod, 1035—the second drive rod, 1036—counter weight, 1037—the first shift fork, 104—chamber, 2—moving platform, 201—cable hole, 202—weight receiving tank, 203—weight falling port, 204—weight falling passage, 205—outlet, 3—weight release gear, 301—probe, 302—connecting strip, 303—support, 304—the third drive rod, 305—the fourth drive rod, 306—the second shift fork, 307—counter weight, 4—trigger gear, 5—guide cable, 601—fixing frame, 602—weight storage chamber, 603—step motor, 604—drive, 605—rotating blade, 606—controllable weight releasing outlet, 607—outer shell, 608—weight inlet, 609—weight outlet, 6010—watertight plug, 7—floating body, 8—parallel releaser, 9—gravity anchor.

DETAILED DESCRIPTION OF PREFERRED EMBODIMENTS

The present disclosure provides a new method for along-the-cable underwater profile measurement, the method takes control over the descending and ascending of the observation platform along the guide cable through throwing out the weight carried by the platform after it descends to a certain depth, the profiler is carried by the observation platform and observes the profile of the water area while the observation platform is making reciprocating motion along the guide cable, thus effectively solving a series of problems that are caused when the batteries are selected as power source of the along-the-cable observation platform.

In the present disclosure, a method for along-the-cable underwater profile measurement comprises:
(1) A guide cable is anchored at the predefined measured water area and an observation platform that can make reciprocating motion along the guide cable is provided, a profiler is mounted on the observation platform, then the buoyancy of the observation platform is adjusted greater than zero and a trigger gear is set at the bottom of the guide cable.
(2) A weight drop-off gear is set at the top of the guide cable, when the observation platform is located at the top of the guide cable, one weight is released by the weight drop-off gear onto the observation platform so that the observation platform descends constantly along the guide cable owing to the released weight, and when the observation platform descends to the given position of the trigger gear at the bottom of the guide cable, the release gear on the observation platform is triggered by the trigger gear to release the weight on the observation platform so that the observation platform returns by its own buoyancy to the top along the guide cable; the profiler on the observation platform observes the profile of the water area while the observation platform is making reciprocating motion along the guide cable.

(3) When the observation platform returns to the top of the guide cable or when the observation platform returns to the top of the guide cable and stays there for a period, another weight is released by the weight drop-off gear onto the observation platform so that the observation platform repeats the reciprocating motion and the profiler subsequently observes the profile of the water area.

In the steps, the weights may be high-density balls such as iron balls or lead balls, of course, may be high-density blocks such as iron blocks or lead blocks and may be selected depending on the specific design requirements. The weight functions to apply a downward force to the observation platform when the weight is released onto the observation platform so that the platform constantly descends along the guide cable. The descending speed of the observation platform may be adjusted through changing the weight of the weights carried by the observation platform, the measurement times of the water area profile is adjusted by setting the quantity of the weights to be released and the measurement cycle of the water area profile is adjusted through setting the projection interval between adjacent weights. Furthermore, since the buoyancy of the observation platform is greater than zero after a profiler is mounted on the platform, the platform will return by its own buoyancy to the top along the guide cable when the weight is thrown out.

Figure 1:
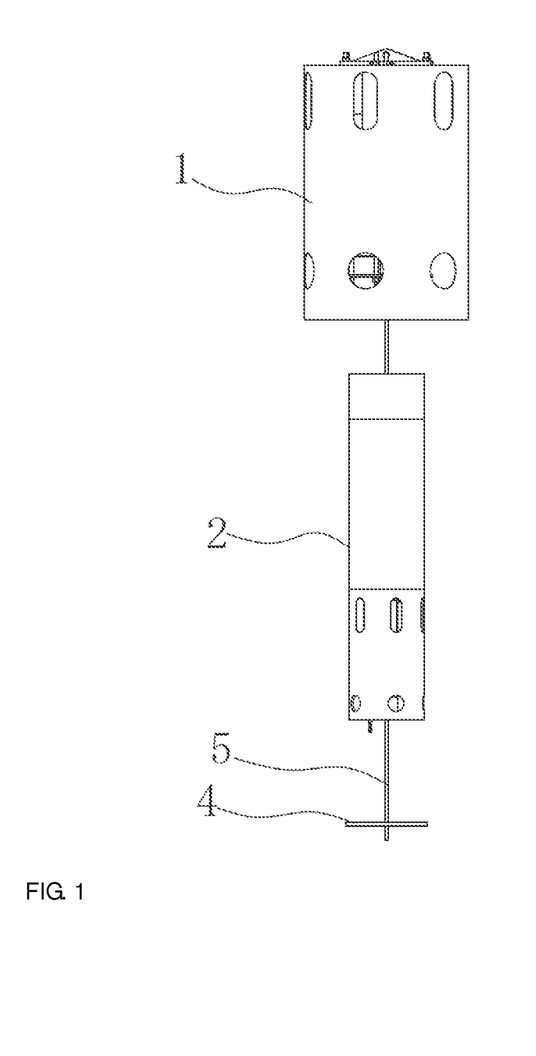
FIG. 1 illustrates an external structural sketch for a specific embodiment of the present invention.
Figure 2:
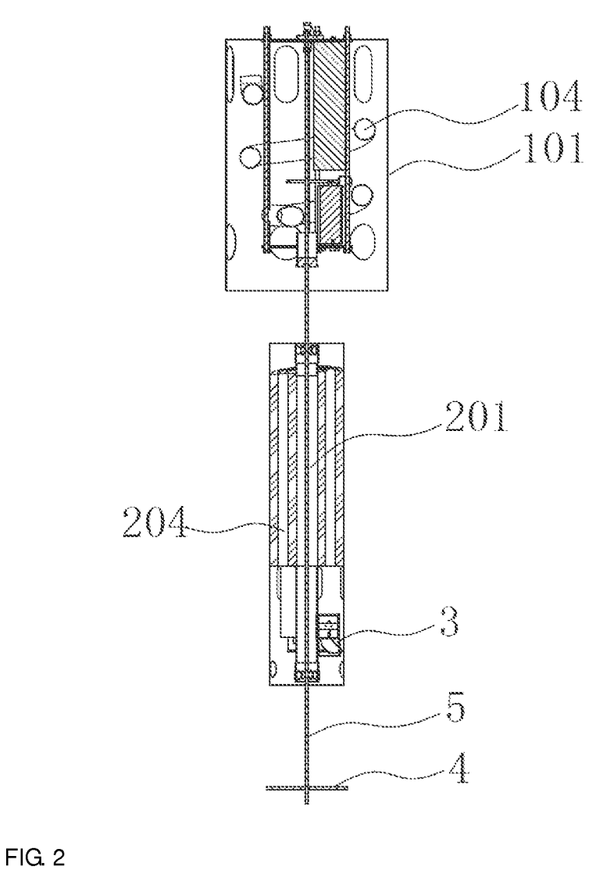
FIG. 2 illustrates a section of FIG. 1.
Figure 3:
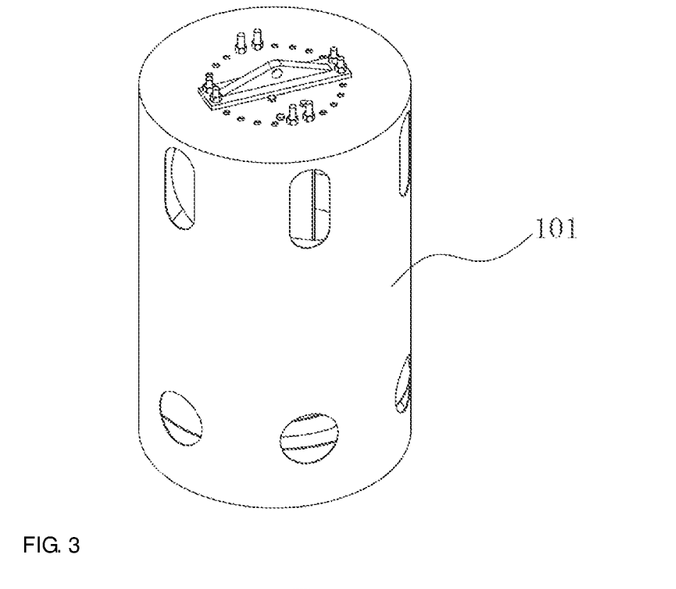
FIG. 3 illustrates an external structural sketch for the weight drop-off gear in an embodiment of the present invention.
Figure 4:
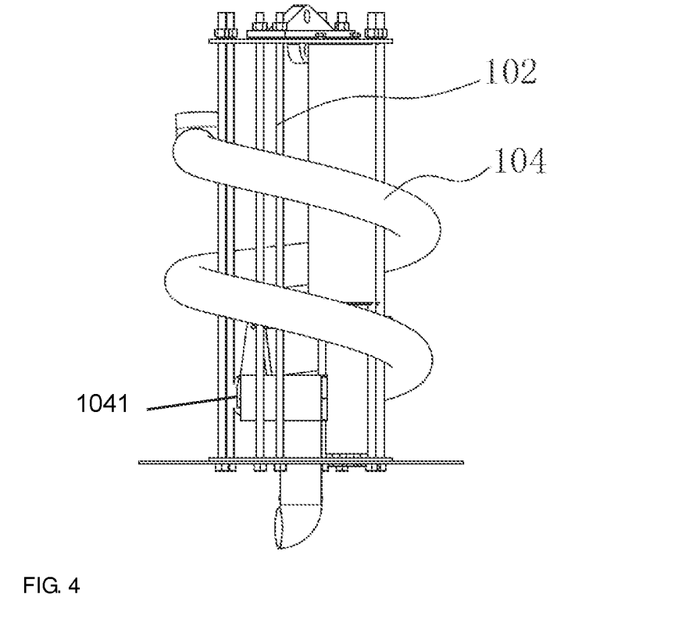
FIG. 4 illustrates a structural sketch for the weight drop-off gear without shell in an embodiment of the present invention.

The method for along-the-cable underwater profile measurement may be achieved through selecting the multiple-structure mode to the technicians of this field. A specific embodiment is only given here for further description about the present disclosure but shall not be regarded as restrictions on the protection scope of the present disclosure. As shown in FIGS. 1 & 2, a type of along-the-cable reciprocating motion control mechanism comprises a weight drop-off gear 1, moving platform 2, weight release gear 3 and trigger gear 4. The moving platform 2 is set at the guide cable 5, can make reciprocating motion along the guide cable 5 and carries a profiler and the buoyancy of the moving platform carrying the profiler is greater than zero. The weight drop-off gear 1 is set at the top of the guide cable 5 and can project the weight onto the moving platform 2 within the predefined period. The weight release gear 3 is provided on the moving platform 2 and the trigger gear 4 is set at the bottom of the guide cable 5. When the moving platform 2 carries a weight, it descends owing to additional gravity, and when the moving platform descends to the bottom of the guide cable, the trigger gear 4 touches the weight release gear 3 to enable it to act accordingly, thus causing the weight to break away from the moving platform. After the weight leaves the moving platform, the moving platform ascends by its own buoyancy to the top of the guide cable 5. When the moving platform 2 returns to the top of the guide cable or when the moving platform 2 returns to the top of the guide cable and stays there for a period, another weight is released by the weight drop-off gear 1 onto the moving platform so that the moving platform repeats the reciprocating motion. The profiler on the moving platform 2 observes the profile of the sea area while the moving platform 2 is making reciprocating motion along the guide cable 5;

The weight drop-off gear 1, moving platform 2, weight release gear 3 and so on involved in the along-the-cable reciprocating motion control mechanism may achieve their corresponding functions through selecting the multiple-structure mode. Here, some specific description about the preferable structure mode is only given in conjunction with the drawings but shall not be considered as restrictions on the protection scope of the present disclosure.

As shown in FIGS. 3 through 6, the weight drop-off gear 1 comprises a cylindrical shell 101 with a support 102 and electronic control unit 103 located in it. A chamber 104 is located on the support 102 and wound like a snake around the outside of the support 102 from top to bottom and several weights to be released such as iron balls or lead balls are stored in the chamber 104. A first block piece 1041 is set at the outlet end of the chamber 104 and the electronic control unit 103 controls the opening and closing of the first block piece. When it is required to release a weight, the electronic control unit 103 actuates the first block piece to be opened, and after the weight is released, the electronic control unit 103 actuates the first block piece to be closed.

Figure 5:
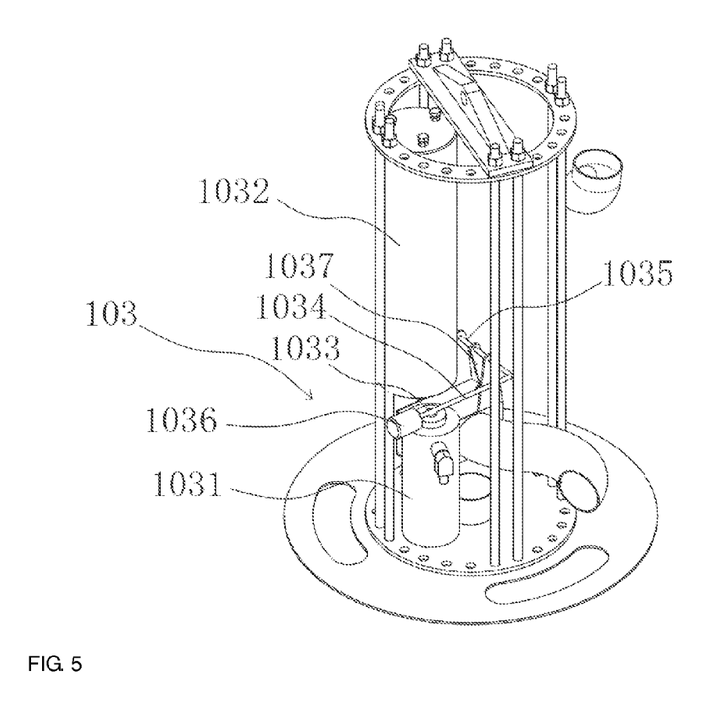
FIG. 5 illustrates a structural view for one side of the weight drop-off gear without shell and chamber in an embodiment of the present invention, mainly showing the electronic control unit part.
Figure 6:
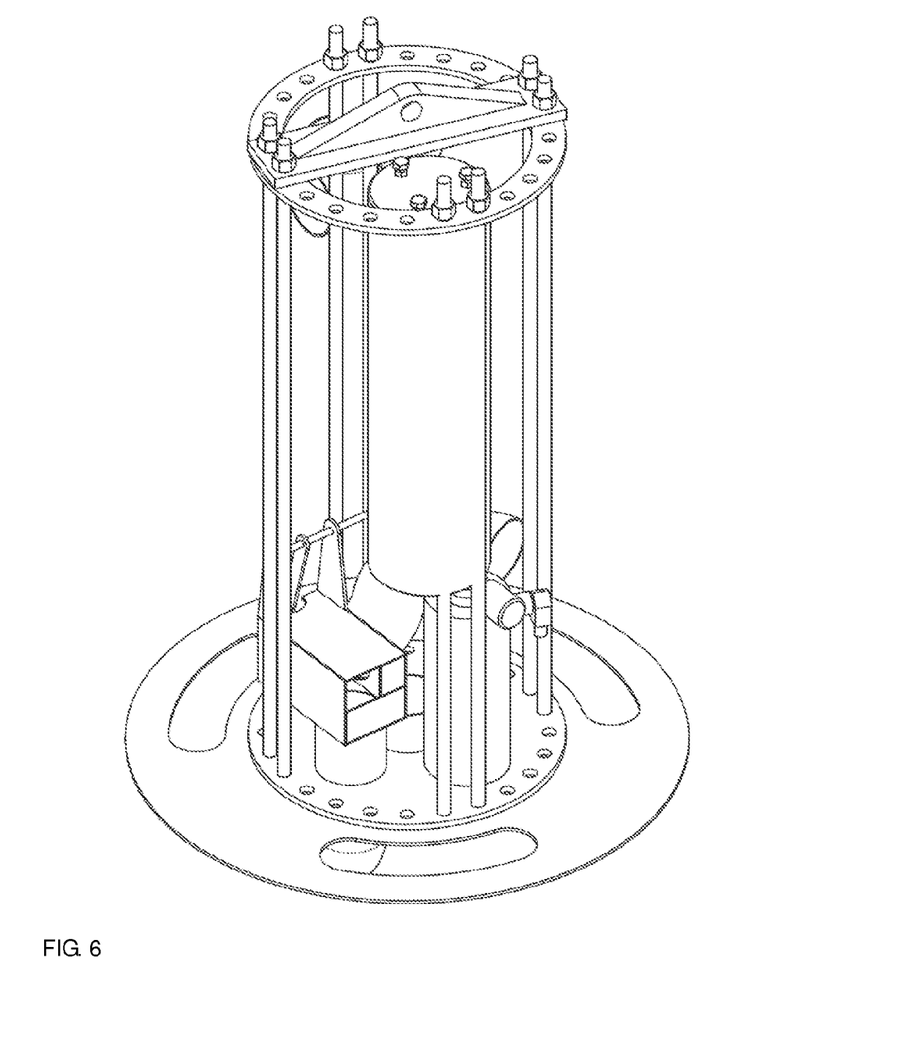
FIG. 6 illustrates a structural view for another side of the weight drop-off gear without shell and chamber in an embodiment of the present invention.
Figure 7:
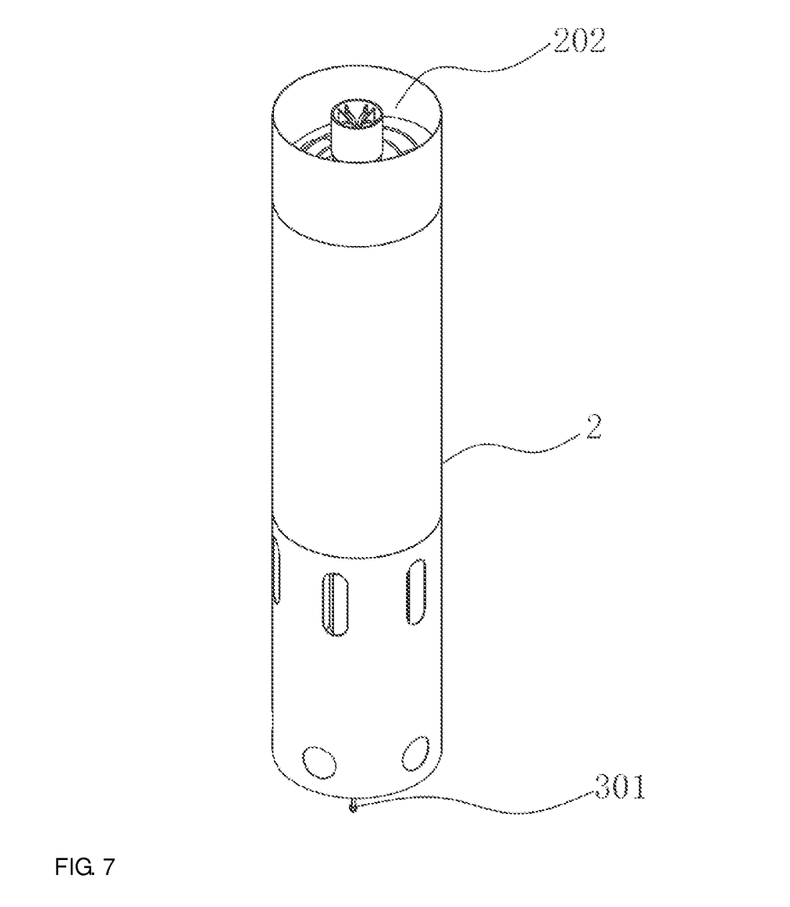
FIG. 7 illustrates an external structural sketch for the moving platform in an embodiment of the present invention.
Figure 8:
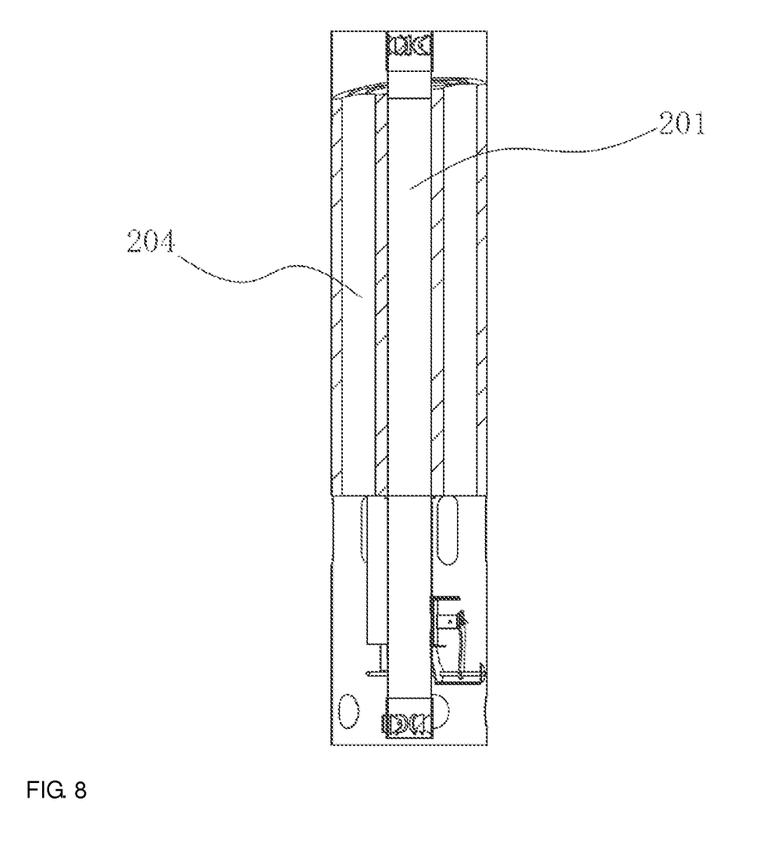
FIG. 8 illustrates a section of FIG. 7.
Figure 9:
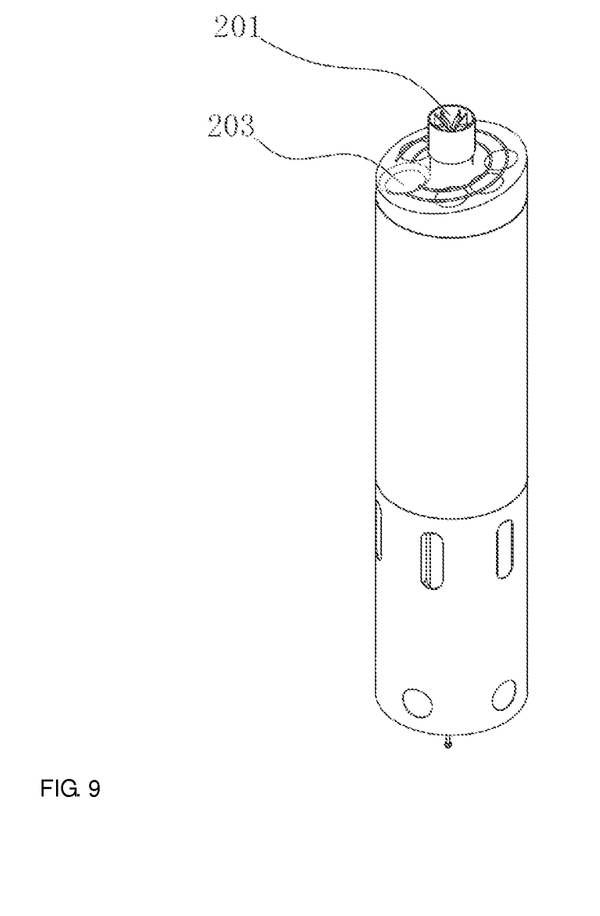
FIG. 9 illustrates a structural sketch for the moving platform without upper shell in an embodiment of the present invention, mainly showing the bottom inclined plane of the weight receiving tank.

Furthermore, the electronic control unit 103 comprises a jack 1031, electronic compartment 1032 and the first drive rod set. A lifting platform 1033 is set at the top of the jack 1031 and the electronics compartment 1032 is electrically connected with the jack 1031 and controls the jacking action for the lifting platform 1033. The first drive rod set comprises the first drive rod 1034 and the second drive rod 1035, the first drive rod 1034, with one end provided with a counter weight 1036 and the other secured to the second drive rod 1035, is horizontally placed on the lifting platform 1033 and the first shift fork 1037 is set at the second drive rod 1035 and connected with the first block piece.

The process of the electronic control unit 103 is as follows:
When it is required to release a weight, the electronics compartment 1032 actuates the lifting platform 1033 at the top of the jack to ascend, thus jacking up the first drive rod 1034, then the first drive rod 1034 causes the second drive rod 1035 connected with it to rotate, thus driving the first shift fork 1037 to rotate and the first shift fork 1037 drives the first block piece connected with it to be opened through movement or rotation. After the weight is released, the lifting platform 1033 descends, the first drive rod 1034, the second drive rod 1035 and the first shift fork 1037 accordingly return to their initial positions by the gravity of the counter weight 1036 and the first block piece is closed. The drop-off time and drop-off times of the weights, and the drop-off interval between adjacent weights, may be controlled by setting the electronics compartment 1032. As shown in FIGS. 7 through 12, the moving platform 2 is cylindrical and a cable hole 201 is set at the shaft center of the moving platform 2 and the guide cable 5 longitudinally passes through the moving platform via the cable hole 201. A weight receiving tank 202, with an inclined bottom plane, is set at the top of the moving platform 2 and a weight falling port 203 is set at the lower position of the inclined plane of the weight receiving tank 202. A weight falling passage 204 is provided inside the moving platform 2, the weight falling port 203 is connected with the inlet at the top of the weight falling passage 204 and a second block piece 2041 is set at the outlet at the bottom of the weight falling passage 204. A weight released by the weight drop-off gear 1 falls into the weight receiving tank 202, rolls to the weight falling port 203 along the inclined plane at the bottom of the weight receiving tank, runs into the weight falling passage 204 via the weight falling port 203 and moves by gravity to the outlet at the bottom along the weight falling passage 204. The weight release gear 3 is set at the bottom of the moving platform 2 and controls the opening and closing of the second block piece. Furthermore, the weight release gear 3 comprises the jacking assembly, the second drive rod set and the second shift fork 306. The jacking assembly comprises the probe 301 and connecting strip 302, the probe 301 is vertically placed, its top is connected with one end of the connecting strip 302 and the other end of the connecting strip 302 is hinged onto the support 303. The second drive rod set comprises the third drive rod 304 and the fourth drive rod 305, the third drive rod 304, with one end connected with the fourth drive rod 305, is located above the connecting strip 302, the second shift fork 306 is located on the fourth drive rod 305 and connected with the second block piece. Counter weights 307 are also provided on the probe 301 and the third drive rod 304. The trigger gear 4 is a barrier sheet used in conjunction with the probe 301.

Figure 10:
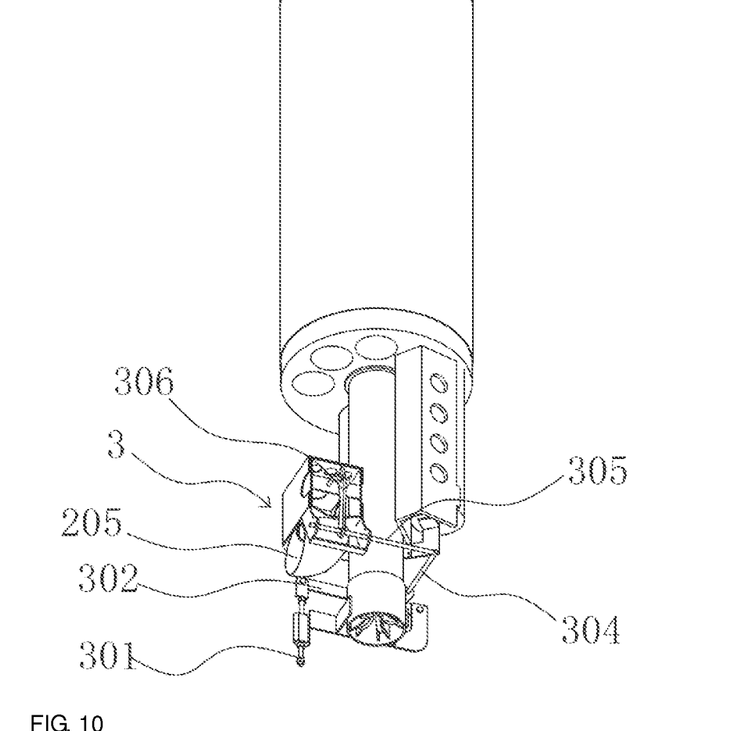
FIG. 10 illustrates a structural view for one side of the moving platform in an embodiment of the present invention, mainly showing the weight release gear part.
Figure 11:
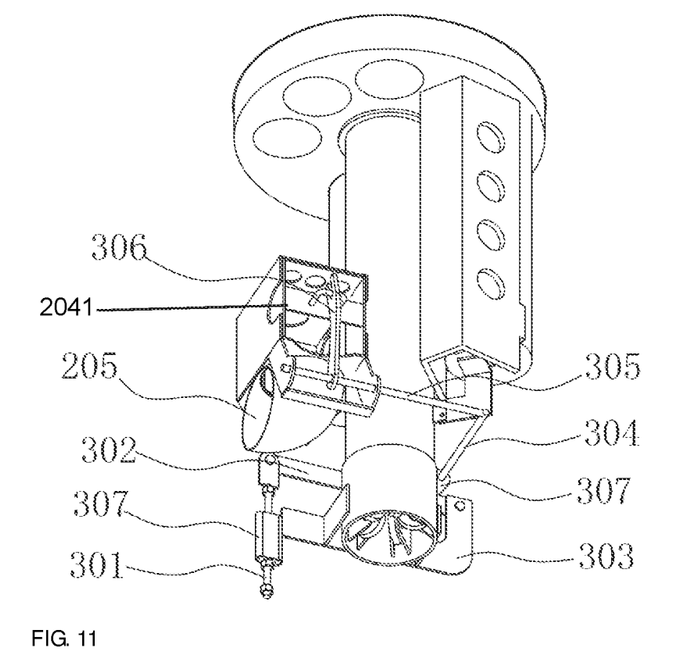
FIG. 11 illustrates a local enlarged view of FIG. 10.
Figure 12:
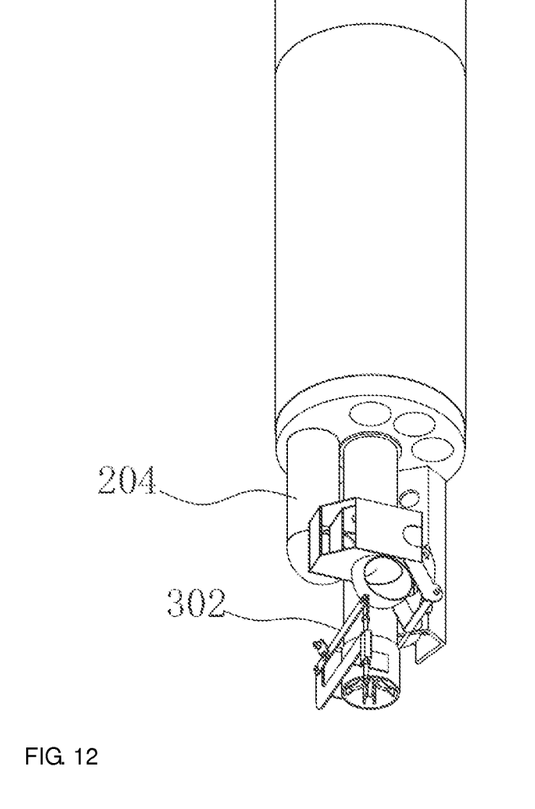
FIG. 12 illustrates a structural view for another side of the moving platform in an embodiment of the present invention.

The working process of the weight release gear 3 is as follows:

When the moving platform 2 descends to the predefined position, the bottom of the probe 301 touches the barrier sheet which applies an upward force to the probe 301 to jack it up. In the process of jacking up the probe 301, the probe 301 drives the connecting strip 302 to rotate upward, the connecting strip 302 drives one end of the third drive rod 304 above it to turn up, the third drive rod 304 drives the fourth drive rod 305 connected with it to rotate, the fourth drive rod 305 drives the second shift fork 306 to rotate and the second shift fork 306 actuates the second block piece connected with it to be opened through movement or rotation. In this case, a weight automatically separate from the outlet 205. After the weight leaves the moving platform 2, the moving platform 2 ascends by its own buoyancy along the guide cable 5. In the process of ascending of the moving platform 2, the probe 301 and the third drive rod 304 return to their initial positions by the gravity of the counter weights 307 and the second block piece is relocated at the closed position.

Figure 13:
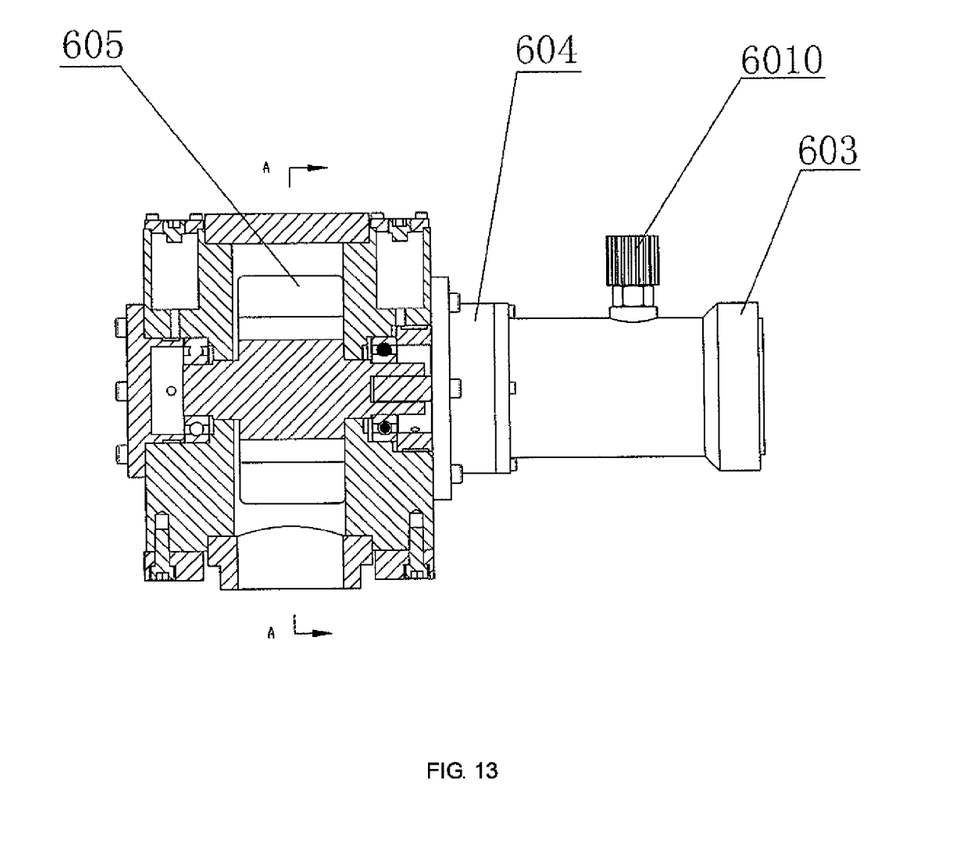
FIG. 13 illustrates a structural sketch for another achievement mode of the weight drop-off gear in an embodiment of the present invention.
Figure 14:
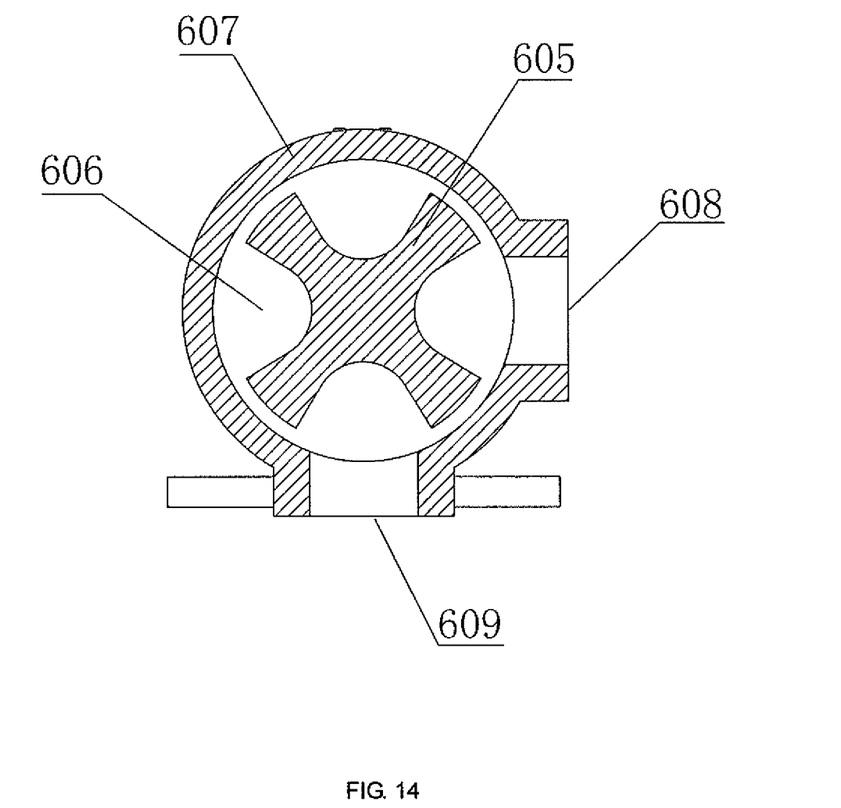
FIG. 14 illustrates View A-A of FIG. 13 and mainly shows the structure of a rotating blade.
Figure 15:
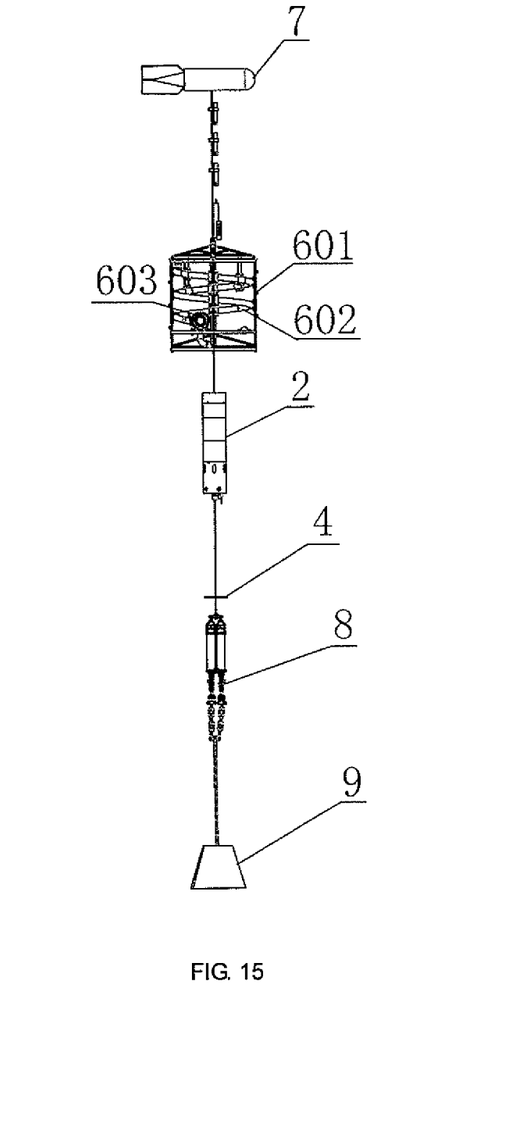
FIG. 15 illustrates the overall structural sketch of an embodiment of the present invention.

In order to improve the working stability of the weight drop-off gear 1 and ensure that it can release the weights one by one in sequence, the following structure mode may also be adopted for the weight drop-off gear 1:

As shown in FIGS. 13 through 15, the weight drop-off gear comprises a fixing frame 601 where a weight storage chamber 602 is located and wound like a snake around the inside of the fixing frame 601 from top to bottom. A device for controlling the drop-off of the weights in the weight storage chamber one by one in sequence is set at the outlet end at the bottom of the weight storage chamber 602. The device comprises the step motor 603, drive 604 and rotating blade 605. The step motor 603 drives the rotating blade 605 to rotate through the drive 604 and one controllable weight releasing outlet 606 is provided every 90 degrees around the circumference of the rotating blade 605, namely, four controllable weight releasing outlets 606 are provided in total with an angle of 90 degrees between any adjacent two releasing outlets. The rotating blade 605 is built in the outer shell 607 where the weight inlet 608 and weight outlet 609 are located in such a way that the weight inlet 608 is connected with the outlet end of the weight storage chamber 602 and perpendicular to the weight outlet 609.

The working process of the weight drop-off gear is as below:

The weight released goes into the outer shell 607 via the end of the outlet of the weight storage chamber 602 and the weight inlet 608 of the outer shell and is located in one of the controllable weight releasing outlets 606 of the rotating blade. To release the weight, the step motor 603 drives the rotating blade 605 to rotate by 90 degrees through the drive 604 and the weight to be released rotates to the weight outlet 609 with the rotating blade 605 and then is released by its own gravity. After the weight is released, the weight at the lowest position in the weight storage chamber 602 continues going into the outer shell 607 by gravity and held by another controllable weight releasing outlet 606 of the rotating blade and is ready for projection.

The related technical contents not mentioned in the mode can be achieved through taking or making reference to prior arts.

It shall be noted that any equivalent alternative mode or obvious variant made by the technicians of this field under the guidance of the Specification shall be included in the protection scope of the present invention.

What is claimed is:

1. A method for an along-the-cable underwater profile measurement, the method comprises:
   (1) anchoring a guide cable at a predefined measured water area, providing an observation platform that can make a reciprocating motion along the guide cable, a profiler is mounted on the observation platform, and the buoyancy of the observation platform is adjusted greater than zero, and a trigger gear is set at the bottom of the guide cable;
   (2) setting a weight drop-off gear at a top of the guide cable, when the observation platform is located at the top of the guide cable, one weight is released by the weight drop-off gear onto the observation platform to enable buoyancy of the observation platform to drop smaller than zero so that the observation platform descends constantly along the guide cable, and when the observation platform descends to a given position of the trigger gear at a bottom of the guide cable, a release gear on the observation platform is triggered by the trigger gear to release the weight on the observation platform so that the observation platform returns by its own buoyancy to the top of the guide cable; the profiler on the observation platform observes the profile of the water area while the observation platform is making a reciprocating motion along the guide cable; and
   (3) when the observation platform returns to the top of the guide cable or when the observation platform returns to the top of the guide cable and stays there for a period, another weight is released by the weight drop-off gear onto the observation platform so that the observation platform repeats the reciprocating motion and the profiler subsequently observes the profile of the water area.

2. The method for along-the-cable underwater profile measurement according to claim 1, wherein, the weights are high-density balls or blocks.

3. The method for along-the-cable underwater profile measurement according to claim 1, wherein, several weights with different weight are provided for the purpose of adjusting a descending speed of the observation platform through changing the weight of the weights carried by the observation platform.

4. The method for along-the-cable underwater profile measurement according to claim 1, wherein, measurement times of the water area profile is adjusted by setting the quantity of the weights to be released, a descending speed of the platform is changed through setting a weight of the weights and a measurement cycle of the water area profile is adjusted through setting the drop-off interval between adjacent weights.

5. The method for along-the-cable underwater profile measurement according to claim 1, wherein, the guide cable longitudinally passes through the observation platform via a cable hole on the observation platform.

6. The method for along-the-cable underwater profile measurement according to claim 1, wherein, the trigger gear is a restraining mass, the release gear is a mechanical release gear, and when the observation platform descends to the bottom of the guide cable, the mechanical release gear on the observation platform will be subject to shock from the restraining mass, triggering actions accordingly so that the observation platform throws out the weight carried by it.

* * * * *